United States Patent
Li et al.

(10) Patent No.: US 11,409,014 B2
(45) Date of Patent: *Aug. 9, 2022

(54) NON-UNIFORM OPTIMAL SURVEY DESIGN PRINCIPLES

(71) Applicant: SHEARWATER GEOSERVICES SOFTWARE INC., Houston, TX (US)

(72) Inventors: Chengbo Li, Houston, TX (US); Charles C. Mosher, Houston, TX (US); Frank D. Janiszewski, Houston, TX (US); Laurence S. Williams, Houston, TX (US)

(73) Assignee: SHEARWATER GEOSERVICES SOFTWARE INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,907

(22) Filed: Oct. 19, 2020

(65) Prior Publication Data

US 2021/0033741 A1 Feb. 4, 2021

Related U.S. Application Data

(63) Continuation of application No. 15/641,916, filed on Jul. 5, 2017, now Pat. No. 10,809,402.

(Continued)

(51) Int. Cl.
*G01V 1/36* (2006.01)
*G01V 1/38* (2006.01)

(52) U.S. Cl.
CPC ............ *G01V 1/368* (2013.01); *G01V 1/3808* (2013.01); *G01V 2210/324* (2013.01)

(58) Field of Classification Search
CPC . G01V 1/368; G01V 1/3808; G01V 2210/324

(Continued)

(56) References Cited

U.S. PATENT DOCUMENTS

| 2,906,363 A | 9/1959 | Clay, Jr. et al. |
| 3,747,055 A | 7/1973 | Greene, Jr. |

(Continued)

FOREIGN PATENT DOCUMENTS

| CN | 103954993 A | 7/2014 |
| EP | 2103959 A2 | 9/2009 |

(Continued)

OTHER PUBLICATIONS

Ala'i R., "Shallow Water Multiple Prediction and Attenuation, case study on data from the Arabian Gulf," SEG International Exposition and 72nd Annual Meeting, Salt Lake City, Utah, Oct. 6-11, 2002, 4 pages.

(Continued)

*Primary Examiner* — Daniel L Murphy
(74) *Attorney, Agent, or Firm* — Polsinelli PC

(57) ABSTRACT

Method for acquiring seismic data is described. The method includes determining a non-uniform optimal sampling design that includes a compressive sensing sampling grid. Placing a plurality of source lines or receiver lines at a non-uniform optimal line interval. Placing a plurality of receivers or nodes at a non-uniform optimal receiver interval. Towing a plurality of streamers attached to a vessel, wherein the plurality of streamers is spaced apart at non-uniform optimal intervals based on the compressive sensing sampling grid. Firing a plurality of shots from one or more seismic sources at non-uniform optimal shot intervals. Acquiring seismic data via the plurality of receivers or nodes.

20 Claims, 6 Drawing Sheets

Related U.S. Application Data

(60) Provisional application No. 62/506,859, filed on May 16, 2017.

(58) Field of Classification Search
USPC .......................................................... 367/24
See application file for complete search history.

(56) References Cited

U.S. PATENT DOCUMENTS

| | | |
|---|---|---|
| 3,747,056 A | 7/1973 | Treybig et al. |
| 3,840,845 A | 10/1974 | Brown |
| 3,877,033 A | 4/1975 | Unz |
| 4,330,873 A | 5/1982 | Peterson |
| 4,404,664 A | 9/1983 | Zachariadis |
| 4,404,684 A | 9/1983 | Takada |
| 4,509,151 A | 4/1985 | Anderson |
| 4,553,221 A | 11/1985 | Hyatt |
| 4,559,605 A | 12/1985 | Norsworthy |
| 4,596,005 A | 6/1986 | Frasier |
| 4,597,066 A | 6/1986 | Frasier |
| 4,721,180 A | 1/1988 | Haughland et al. |
| 4,852,004 A | 7/1989 | Manin |
| 4,958,331 A | 9/1990 | Wardle |
| 4,967,400 A | 10/1990 | Woods |
| 4,992,990 A | 2/1991 | Langeland et al. |
| 5,079,703 A | 1/1992 | Mosher et al. |
| 5,092,423 A | 3/1992 | Petermann |
| 5,148,406 A | 9/1992 | Brink et al. |
| 5,168,472 A | 12/1992 | Lockwood |
| 5,353,223 A | 10/1994 | Norton et al. |
| 5,469,404 A | 11/1995 | Barber et al. |
| 5,487,052 A | 1/1996 | Cordsen |
| 5,517,463 A | 5/1996 | Hornbostel et al. |
| 5,724,306 A | 3/1998 | Barr |
| 5,774,417 A | 6/1998 | Corrigan et al. |
| 5,787,051 A | 7/1998 | Goodway et al. |
| 5,835,450 A | 11/1998 | Russell |
| 5,963,879 A | 10/1999 | Woodward et al. |
| 5,973,995 A | 10/1999 | Walker et al. |
| 6,009,042 A | 12/1999 | Workman et al. |
| 6,493,636 B1 | 12/2002 | DeKok |
| 6,509,871 B2 | 1/2003 | Bevington |
| 6,590,831 B1 | 7/2003 | Bennett et al. |
| 6,691,038 B2 | 2/2004 | Zajac |
| 6,876,599 B1 | 4/2005 | Combee |
| 7,167,412 B2 | 1/2007 | Tenghamn |
| 7,234,407 B1 | 6/2007 | Levine et al. |
| 7,359,283 B2 | 4/2008 | Vaage et al. |
| 7,408,836 B2 | 8/2008 | Muyzert et al. |
| 7,451,717 B1 | 11/2008 | Levine et al. |
| 7,499,374 B2 | 3/2009 | Ferber |
| 7,499,737 B2 | 3/2009 | Mizuta et al. |
| 7,515,505 B2 | 4/2009 | Krohn et al. |
| 7,545,703 B2 | 6/2009 | Lunde et al. |
| 7,646,671 B2 | 1/2010 | Pan et al. |
| 7,835,224 B2 | 11/2010 | Robertsson et al. |
| 7,993,164 B2 | 8/2011 | Chatterjee et al. |
| 8,509,027 B2 | 8/2013 | Strobbia et al. |
| 8,559,270 B2 | 10/2013 | Abma |
| 8,619,497 B1 | 12/2013 | Sallas et al. |
| 8,681,581 B2 | 3/2014 | Moldoveanu et al. |
| 8,711,654 B2 | 4/2014 | Moldoveanu et al. |
| 8,737,184 B2 | 5/2014 | Yamazaki |
| 8,897,094 B2 | 11/2014 | Eick et al. |
| 9,110,177 B1 | 8/2015 | Opfer |
| 9,234,971 B2 * | 1/2016 | Khan ................. G01V 1/003 |
| 9,291,728 B2 | 3/2016 | Eick et al. |
| 9,529,102 B2 | 12/2016 | Eick et al. |
| 9,632,193 B2 | 4/2017 | Li et al. |
| 9,690,003 B2 | 6/2017 | Sallas |
| 9,823,372 B2 | 11/2017 | Eick et al. |
| 9,846,248 B2 | 12/2017 | Eick et al. |
| 10,267,939 B2 | 4/2019 | Eick et al. |
| 10,514,474 B2 | 12/2019 | Eick et al. |
| 10,605,941 B2 | 3/2020 | Li et al. |
| 10,809,402 B2 * | 10/2020 | Li ....................... G01V 1/368 |
| 10,823,867 B2 | 11/2020 | Eick et al. |
| 10,989,826 B2 | 4/2021 | Eick et al. |
| 11,035,968 B2 | 6/2021 | Li et al. |
| 2004/0172199 A1 | 9/2004 | Chavarria et al. |
| 2005/0088914 A1 | 4/2005 | Ren et al. |
| 2006/0164916 A1 | 7/2006 | Krohn et al. |
| 2006/0239117 A1 | 10/2006 | Singh et al. |
| 2006/0268682 A1 | 11/2006 | Vasseur |
| 2007/0013546 A1 | 1/2007 | McConnell et al. |
| 2007/0025182 A1 | 2/2007 | Robertsson |
| 2007/0027656 A1 | 2/2007 | Baraniuk et al. |
| 2007/0276660 A1 | 11/2007 | Pinto |
| 2008/0008037 A1 | 1/2008 | Welker |
| 2008/0049551 A1 | 2/2008 | Muyzert et al. |
| 2008/0080309 A1 | 4/2008 | Elkington et al. |
| 2008/0089174 A1 | 4/2008 | Sollner et al. |
| 2008/0144434 A1 | 6/2008 | Hegna et al. |
| 2008/0151688 A1 | 6/2008 | Goujon |
| 2008/0205193 A1 | 8/2008 | Krohn et al. |
| 2008/0225642 A1 | 9/2008 | Moore et al. |
| 2008/0285380 A1 | 11/2008 | Rouquette |
| 2009/0000200 A1 | 1/2009 | Heuel et al. |
| 2009/0006053 A1 | 1/2009 | Carazzone et al. |
| 2009/0010101 A1 | 1/2009 | Lunde et al. |
| 2009/0067285 A1 | 3/2009 | Robertsson et al. |
| 2009/0073805 A1 | 3/2009 | Tulett et al. |
| 2009/0092006 A1 | 4/2009 | Teigen et al. |
| 2009/0122641 A1 | 5/2009 | Hillesund et al. |
| 2009/0141587 A1 | 6/2009 | Welker et al. |
| 2009/0213693 A1 | 8/2009 | Du et al. |
| 2009/0231956 A1 | 9/2009 | Schonewille |
| 2009/0251992 A1 | 10/2009 | Van Borselen et al. |
| 2009/0262601 A1 | 10/2009 | Hillesund et al. |
| 2009/0279384 A1 | 11/2009 | Pavel |
| 2009/0279386 A1 | 11/2009 | Monk |
| 2009/0323472 A1 | 12/2009 | Howe |
| 2010/0002536 A1 | 1/2010 | Brewer et al. |
| 2010/0103772 A1 | 4/2010 | Eick et al. |
| 2010/0128563 A1 | 5/2010 | Strobbia et al. |
| 2010/0195434 A1 | 8/2010 | Menger et al. |
| 2010/0208554 A1 | 8/2010 | Chiu et al. |
| 2010/0211321 A1 | 8/2010 | Ozdemir et al. |
| 2010/0265799 A1 | 10/2010 | Cevher et al. |
| 2010/0299070 A1 | 11/2010 | Abma |
| 2011/0019502 A1 | 1/2011 | Eick et al. |
| 2011/0038227 A1 | 2/2011 | Kostov et al. |
| 2011/0128818 A1 | 6/2011 | Eick et al. |
| 2011/0156494 A1 | 6/2011 | Mashinsky |
| 2011/0170796 A1 | 7/2011 | Qian et al. |
| 2011/0218737 A1 | 9/2011 | Gulati |
| 2011/0286302 A1 | 11/2011 | Welker et al. |
| 2011/0305106 A1 * | 12/2011 | Eick ................... G01V 1/20 367/17 |
| 2011/0305107 A1 | 12/2011 | Eick et al. |
| 2011/0305113 A1 | 12/2011 | Eick et al. |
| 2011/0307438 A1 | 12/2011 | Fernandez Martinez |
| 2011/0317517 A1 | 12/2011 | Borresen et al. |
| 2012/0002503 A1 | 1/2012 | Janiszewski et al. |
| 2012/0014212 A1 | 1/2012 | Eick et al. |
| 2012/0051181 A1 | 3/2012 | Eick et al. |
| 2012/0082004 A1 | 4/2012 | Boufounos |
| 2012/0113745 A1 | 5/2012 | Eick et al. |
| 2012/0143604 A1 | 6/2012 | Singh |
| 2012/0281499 A1 | 11/2012 | Eick et al. |
| 2012/0294116 A1 | 11/2012 | Kamata |
| 2012/0300585 A1 | 11/2012 | Cao et al. |
| 2013/0121109 A1 | 5/2013 | Baardman et al. |
| 2013/0135966 A1 | 5/2013 | Rommel et al. |
| 2013/0250720 A1 | 9/2013 | Monk et al. |
| 2013/0294194 A1 | 11/2013 | Pritchard |
| 2014/0133271 A1 | 5/2014 | Sallas |
| 2014/0146638 A1 | 5/2014 | Renaud |
| 2014/0211590 A1 | 7/2014 | Sallas |
| 2014/0278289 A1 | 9/2014 | Etgen |
| 2014/0303898 A1 | 10/2014 | Poole |
| 2014/0362663 A1 | 12/2014 | Jones et al. |
| 2015/0016218 A1 | 1/2015 | Welker et al. |
| 2015/0078128 A1 | 3/2015 | Eick et al. |

(56) References Cited

U.S. PATENT DOCUMENTS

| | | | |
|---|---|---|---|
| 2015/0124560 A1* | 5/2015 | Li | G01V 1/30 367/14 |
| 2015/0272506 A1 | 10/2015 | Childs et al. | |
| 2015/0348568 A1 | 12/2015 | Li et al. | |
| 2016/0018547 A1 | 1/2016 | Eick et al. | |
| 2016/0341839 A1 | 11/2016 | Kazinnik et al. | |
| 2017/0031045 A1 | 2/2017 | Poole et al. | |
| 2017/0082761 A1 | 3/2017 | Li et al. | |
| 2017/0090053 A1 | 3/2017 | Eick et al. | |
| 2017/0108604 A1 | 4/2017 | Turquais et al. | |
| 2018/0067221 A1 | 3/2018 | Eick et al. | |
| 2018/0335536 A1 | 11/2018 | Li et al. | |
| 2019/0129050 A1 | 5/2019 | Li et al. | |
| 2019/0293813 A1 | 9/2019 | Li et al. | |
| 2019/0310387 A1 | 10/2019 | Eick et al. | |
| 2020/0104745 A1 | 4/2020 | Li | |
| 2020/0225377 A1 | 7/2020 | Li et al. | |

FOREIGN PATENT DOCUMENTS

| | | | | |
|---|---|---|---|---|
| EP | 2592439 A2 | 5/2013 | | |
| WO | WO-2005019865 A2 | 3/2005 | | |
| WO | WO-2008073178 A2 | 6/2008 | | |
| WO | WO-2009092025 A2 | 7/2009 | | |
| WO | WO-2010149589 A2 | 12/2010 | | |
| WO | WO-2011156491 A1 | 12/2011 | | |
| WO | WO-2011156494 A2 | 12/2011 | | |
| WO | WO-2012166737 A2 | 12/2012 | | |
| WO | WO-2013105075 A1 | 7/2013 | | |
| WO | WO-2014057440 A1 | 4/2014 | | |
| WO | WO-2015066481 A * | 5/2015 | | G01V 1/003 |
| WO | WO-2015066481 A1 | 5/2015 | | |
| WO | WO-2016009270 A1 | 1/2016 | | |
| WO | WO-2018085567 A1 | 5/2018 | | |

OTHER PUBLICATIONS

Almendros J., et al., "Mapping the Sources of the Seismic Wave Field at Kilauea Volcano, Hawaii, Using Data Recorded on Multiple Seismic Antennas," Bulletin of the Seismological Society of America, vol. 92(6), Aug. 2002, pp. 2333-2351.

Amir V., et al., "Structural Evolution Of The Northern Bonaparte Basin, Northwest Shelf Australia," Proceedings, Indonesian Petroleum Association, Thirty-Fourth Annual Convention & Exhibition, May 2010, 17 Pages.

Baraniuk R.G., "Compressive Sensing," IEEE Signal Processing Magazine, Jul. 2007, vol. 24(4), 9 pages.

Barzilai J., et al., "Two Point Step Size Gradient Methods," IMA Journal of Numerical Analysis, 1988, vol. 8, pp. 141-148.

Bradley D.J., et al., "Memorandum Opinion and Order," ConocoPhillips Company v. In-Depth Compressive Seismic, Civil Action No. H-18-0803, entered Apr. 26, 2019, 49 pages.

Buia M., et al., "Shooting Seismic Surveys in Circles," Oilfield Review, 2008, pp. 18-31.

Candes E., et al., "Sparsity and Incoherence in Compressive Sampling," Applied and Computational Mathematics, Caltech, Pasadena, CA 91125 and Electrical and Computer Engineering, Georgia Tech, Atlanta, GA 90332, Nov. 2006, 20 pages.

Carlson D., et al., "Increased Resolution and Penetration from a Towed Dual-Sensor Streamer", First Break, Dec. 2007, vol. 25, pp. 71-77.

Cordsen A., et al., "Planning Land 3D Seismic Surveys," Geophysical Developments Series No. 9, Society of Exploration Geophysicists (SEG), Jan. 2000, 16 pages.

Dragoset B., et al., "A Perspective on 3D Surface-Related Multiple Elimination", Geophysics, Sep.-Oct. 2010, vol. 75, No. 5, pp. 75A245-75A261.

Foster D.J., et al., "Suppression of Multiple Reflections Using the Radon Transform", Mar. 1992, Geophysics, vol. 57, No. 3, pp. 386-395.

Hennenfent G., et al., "Application of Stable Signal Recovery to Seismic Data Interpolation," Gilles Hennenfent and Felix J. Herrmann Earth & Ocean Sciences Dept., University of British Columbia 2006, 4 pages.

Hennenfent G., et al., "Simply Denoise: Wavefield Reconstruction via Jittered undersampling," Geophysics, May-Jun. 2008, vol. 73(3), pp. V19-V28.

Herrmann F.J., "Randomized Sampling and Sparsity: Getting More Information from Fewer Samples," Geophysics, vol. 75(6), Nov.-Dec. 2010, pp. WB173-WB187.

Hindriks K., et al., "Reconstruction of 3D Seismic Signals Irregularly Sampled Along Two Spatial Coordinates," Geophysics, Jan.-Feb. 2000, vol. 65(1), pp. 253-263.

Huang H., et al., "Joint SRME and Model-Based Water-Layer Demultiple for Ocean Bottom Node", 2016 SEG International Exposition and Annual Meeting, Retrieved from Internet: URL: https://www.cgg.com/sites/default/files/2020-11/cggv_0000026243.pdf, pp. 4508-4512.

International Search Report and Written Opinion for Application No. PCT/US11/039640, dated Oct. 26, 2011, 8 Pages.

International Search Report for Application No. PCT/US2016/053750, dated Dec. 27, 2016, 2 Pages.

International Search Report for Application No. PCT/US2017/59760, dated Apr. 13, 2018, 2 pages.

International Search Report for International Application No. PCT/US2011/039635, dated Oct. 25, 2011, 2 pages.

International Search Report for International Application No. PCT/US2011/39640, dated Oct. 26, 2011, 3 pages.

International Search Report for International Application No. PCT/US2017/040796, dated Sep. 13, 2018, 2 pages.

Jin H., et al., "MWD for Shallow Water Demultiple: A Hibernia Case Study," Geo Convention 2012: Vision, 5 Pages.

Kumar R., et al., "Source Separation for Simultaneous Ttowed-Streamer Marine Acquisition—A Compressed Sensing Approach," Geophysics, vol. 80(6), Nov.-Dec. 2015, pp. WD73-WD88.

Li C., et al., "A Multi-Stage Inversion Method for Simultaneous Source Deblending of Field Data," SEG Annual Meeting 2014, Denver, Colorado, USA, Oct. 26, 2014, pp. 3610-3615.

Li C., et al., "Aspects of Implementing Marine Blended Source Acquisition in the Field," SEG International Exposition and 87th Annual Meeting, 2017, pp. 42-46.

Li C., et al., "Improving Streamer Data Sampling and Resolution via Non-Uniform Optimal Design and Reconstruction," SEG International Exposition and 87th Annual Meeting, 2017, pp. 4241-4245.

Li C., et al., "Interpolated Compressive Sensing for Seismic Data Reconstruction," SEG Las Vegas 2012 Annual Meeting, 2012, 6 pages.

Li C., et al., "Joint Source Deblending and Reconstruction for Seismic Data," SEG Houston 2013 Annual Meeting, 2013, pp. 82-87.

Li C., et al., "Marine Towed Streamer Data Reconstruction Based on Compressive Sensing," SEG Houston 2013 Annual Meeting, 2013, pp. 3597-3602.

Lin D., et al., "3D SRME Prediction and Subtraction Practice for Better Imaging", 2005, SEG Houston Annual Meeting, 5 pgs.

Liu B., et al., "Minimum Weighted Norm Interpolation of Seismic Records," Geophysics, Nov.-Dec. 2004, vol. 69(6), pp. 1560-1568.

Lotter T., et al., "Noise Reduction by Maximum a Posteriori Spectral Amplitude Estimation with Supergaussian Speech Modeling," International Workshop on Acoustic Echo and Noise Control (IWAENC2003), Kyoto, Japan, retrieved from URL: https://pdfs.semanticscholar.org/06e2/ad185cc5a809bb7493f8aea8afdad13105fb.pdf, on Nov. 16, 2019, Sep. 2003, pp. 83-86.

Mahdad A., et al., "Separation of Blended Data by Iterative Estimation and Subtraction of Blending Interference Noise," Geophysics, vol. 76(3), May-Jun. 2011, pp. Q9-Q17.

Martin J., et al., "Acquisition of Marine Point Receiver Seismic Data With a Towed Streamer," SEG Technical Program Expanded Abstracts 2000, 4 pages.

Maurer H., et al., "Recent advances in optimized geophysical survey design," Seismic Data Acquisition, Geophysics, Sep.-Oct. 2010, vol. 75(5), SEG Press Book, pp. 75A177-75A194.

(56) References Cited

OTHER PUBLICATIONS

Memorandum Opinion and Order, ConocoPhillips Company v. In-Depth Compressive Seismic, Inc., et al., Civil Action No. H-18-0803, entered Apr. 26, 2019, 49 pgs.
Milton A., et al., "Reducing Acquisition Costs with Random Sampling and Multidimensional Interpolation," SEG San Antonio 2011 Annual Meeting, 2011, pp. 52-56.
Moldoveanu N., "Random Sampling: A New Strategy for Marine Acquisition," SEG Expanded Abstracts, Denver, CO, 2010 Annual Meeting, 2010, pp. 51-55.
Mosher C., et al., "Increasing the Efficiency of Seismic Data Acquisition Via Compressive Sensing," Offshore Technology conference, Asia, Kuala Lumpur, Malaysia, Mar. 25-28, 2014, 4 pages.
Mosher C.C., et al., "An In-situ Analysis of 3-D Seismic Lateral Resolution," Borehole Geophysics, BHG 6.3, 1985, pp. 109-111.
Mosher C.C., et al., "Compressive Seismic Imaging: Moving from research to production," SEG International Exposition and 87th Annual Meeting, 2017, pp. 74-78.
Mosher C.C., et al., "Compressive Seismic Imaging," SEG Las Vegas 2012 Annual Meeting, 2012, DOI http://dx.doi.org/10.1190/segam2012-1460.1, 5 pages.
Mosher C.C., et al., "Non-Uniform Optimal Sampling for Seismic Survey Design," 74th EAGE Conference and Exhibition, Extended Abstracts, X034, Copenhagen, Denmark, Jun. 4-7, 2012, 5 pages.
Mosher C.C., et al., "Non-Uniform Optimal Sampling for Simultaneous Source Survey Design," SEG Annual Meeting, 2014, pp. 105-109.
Mosher C.C., "Generalized Windowed Transforms for Seismic Processing and Imaging," 2012 Annual SEG Meeting Las Vegas, Nevada, One Petro, SEG-2012-1196, Published by Society of Exploration Geophysicists, 4 pages.
Musser J.A., et al., "Streamer Positioning and Spread Stabilization for 4D Seismic," SEG 2006 Annual Meeting, New Orleans, 2006, 4 pages.
Office Action for Canadian Patent Application No. 2800127, dated Oct. 18, 2017, 4 pages.
Office Communication for EP Patent Application No. 11793092.5, dated Jul. 20, 2017, 5 pages.
Petition for Inter Partes Review of U.S. Pat. No. 9,846,248, In-Depth Geophysical, Inc., et al., v. ConocoPhillips Company, IPR 2019-00850, filed Mar. 20, 2019, Filewrapper, 1789 pages.
Response to Office Action for Canadian Patent Application No. 2,800,127, dated Apr. 6, 2017, 27 pages.
Sacchi M.D., "A Tour of High Resolution Transforms," Frontiers & Innovation, CSPG, CSEG, CWLS Convention, Calgary, Alberta, Canada, Expanded Abstracts, 2009, pp. 665-668.
Shapiro H.S., et al., "Alias-Free Sampling of Random Noise," SIAM Journal on Applied Mathematics, 1960, vol. 8(2), pp. 225-248.
Stolt R.H., "Seismic Data Mapping and Reconstruction," Geophysics, May-Jun. 2002, vol. 67(3), pp. 890-908.
Thomsen L., "Weak Elastic Anisotropy", Geophysics, Oct. 1986, vol. 51, No. 10, Society of Exploration Geophysicists, pp. 1954-1966.
Trad D., "Interpolation and Multiple Attenuation with Migration Operators," Geophysics, vol. 68(6), Nov.-Dec. 2003, pp. 2043-2054.
Wang L., et al., "Distributed Reconstruction via Alternating Direction Method," Hindawi Publishing Corporation, Computational and Mathematical Methods in Medicine, 2013, vol. 2013, Article ID 418747, pp. 1-7.
Wang P., et al., "Model-Based Water-Layer Demultiple", 2011, SEG San Antonio Annual Meeting, pp. 3551-3555.
Wang Y., et al., "Recovery of Seismic Wavefields based on Compressive Sensing by an l1-norm Constrained Trust Region Method and the Piecewise Random Subsampling," Geophysical Journal International, 2011(187), pp. 199-213.
Zhang H., et al., "A Nonmonotone Line Search Technique and its Application to Unconstrained Optimization," Society of Industrial and Applied Mathematics, 2004, vol. 14(4), pp. 1043-1056.
Zwartjes P.M., et al., "Fourier Reconstruction of Non-uniformly Sampled, Aliased Data," SEG Int'l Exposition and 74th Annual Meeting, Denver, Colorado, Oct. 10-15, 2004, 4 pages.
Zwartjes P.M., et al., "Fourier Reconstruction of Nonuniformly Sampled, Aliased Seismic Data," Geophysics, Jan.-Feb. 2007, vol. 72(1), pp. V21-V32.

* cited by examiner

NON-UNIFORM OPTIMAL SURVEY DESIGN PRINCIPLES

CROSS-REFERENCE TO RELATED APPLICATIONS

This application is a continuation of U.S. application Ser. No. 15/641,916, filed Jul. 5, 2017 which claims benefit of U.S. Patent Application Ser. No. 62/506,859 filed May 16, 2017, each of which is incorporated in its entirety by reference.

FIELD OF THE INVENTION

The present invention relates generally to seismic imaging. More particularly, but not by way of limitation, embodiments of the present invention include tools and methods for designing and implementing seismic data acquisition using non-uniform optimal sampling principles.

BACKGROUND OF THE INVENTION

Compressive sensing (CS) is an emerging field in signal processing that has applications in many different disciplines including seismic surveying. Traditionally, Nyquist-Shannon sampling theorem established the sufficient condition for a sampling rate that permits a digital signal to capture all the information from a continuous-time signal of finite bandwidth. Compressive sensing provides a new paradigm of sampling which requires far fewer measurements compared to Nyquist-Shannon sampling criterion. Thus far, compressive sensing theory suggests that successful signal recovery can be best achieved through random measurements together with sparsity of the true signal. However, applying random sampling to seismic surveys raises many concerns and uncertainties.

BRIEF SUMMARY OF THE DISCLOSURE

The present invention relates generally to seismic imaging. More particularly, but not by way of limitation, embodiments of the present invention include tools and methods for designing and implementing seismic data acquisition using non-uniform optimal sampling principles.

One method of acquiring seismic data includes determining a non-uniform optimal sampling design that includes a compressive sensing sampling grid; placing a plurality of source lines or receiver lines at a non-uniform optimal line interval; placing a plurality of receivers or nodes at a non-uniform optimal receiver interval; towing a plurality of streamers attached to a vessel, wherein the plurality of streamers is spaced apart at non-uniform optimal intervals based on the compressive sensing sampling grid; firing a plurality of shots from one or more seismic sources at non-uniform optimal shot intervals; and acquiring seismic data via the plurality of receivers or nodes.

BRIEF DESCRIPTION OF THE DRAWINGS

A more complete understanding of the present invention and benefits thereof may be acquired by referring to the follow description taken in conjunction with the accompanying drawings in which:

FIG. 1A shows a shot interval distribution from a single gun. FIG. 1B shows cable configuration.

FIG. 2A shows a shot interval distribution. FIG. 2B shows cable configuration.

FIG. 5A shows a distribution of shot intervals. FIG. 5B shows a distribution of shot time intervals.

FIG. 6A shows data acquired with conventional regular design. FIG. 6B shows corresponding deblending result of FIG. 6A. FIG. 6C shows data acquired with a non-uniform optimal sampling shot design. FIG. 6D shows corresponding deblending result of FIG. 6C.

DETAILED DESCRIPTION

Figure 1A:
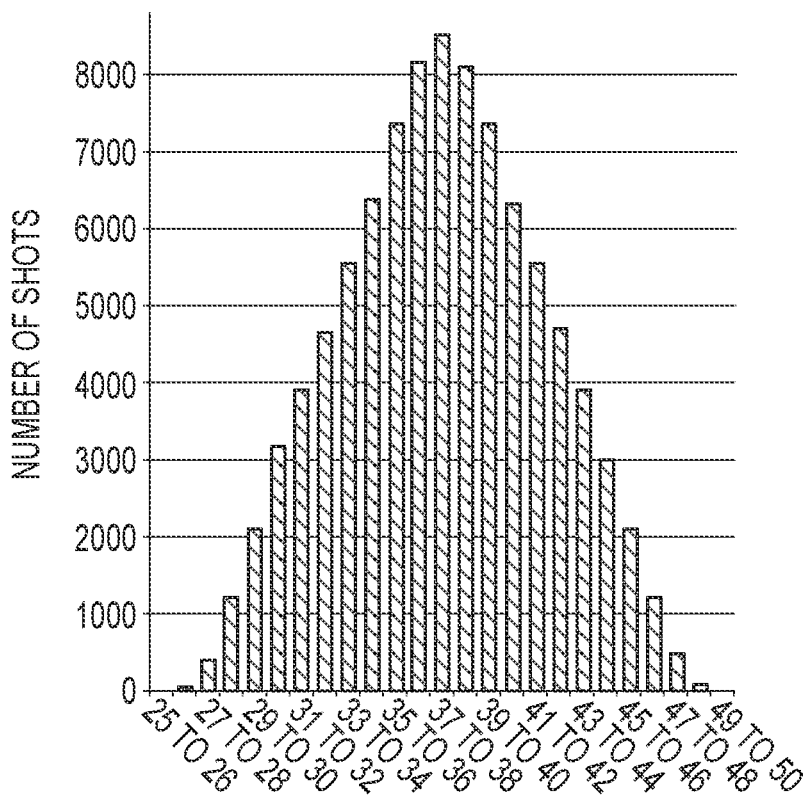
FIGS. 1A-1B illustrate an embodiment of non-uniform optimal sampling design as applied to a marine seismic survey utilizing 12 streamers.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In signal processing, compressive sensing (CS) asserts that the exact recovery of certain signals can be obtained from far fewer measurements than as required by Shannon's sampling criterion. Generally speaking, applicability of compressive sensing for imaging depends on sparsity of signals and incoherence of sampling waveforms.

The present invention provides systems and methods for acquiring seismic data with relatively few measurements by utilizing compressive sensing principles. These principles include, but are not limited to, non-uniform optimal sampling (NUOS) design, seismic data reconstruction of data acquired using NUOS design, and blended source acquisition with NUOS design. These principles have been applied to real-world seismic survey scenarios including marine and ocean bottom seismic (OBS) and land surveys to increase data bandwidth and resolution.

Non-Uniform Optimal Sampling Design

One of the goals of non-uniform optimal sampling design is to find an optimal sampling grid that favors seismic data reconstruction. Non-uniform optimal sampling design provides a mathematical framework for optimizing both source and receiver configuration designs. As a summary, the following mathematical description of non-uniform optimal sampling design is provided.

The forward model for seismic data reconstruction can be described as $$b=Dx,\ b=RS^*x,\ x=Su, \quad (1)$$

where b represents acquired seismic data on an irregular observed grid and u represents reconstructed seismic data on a finer regular reconstructed grid. The operator R is a restriction/sampling operator, which maps data from the reconstructed grid to the observed grid. If S is a suitably chosen dictionary (possibly over-complete), x is a sparse representation of u which has a small cardinality.

Mutual coherence is a measure of incoherency between sparsity basis S and sampling operator R. A high-fidelity data reconstruction requires the mutual coherence to be as small as possible. Assuming D=RS* can be written in a matrix form and $d_i$ represent different columns in D, the mutual coherence µ can be defined as, $$\mu(R, S) = \max_{i \neq j} |d_i^* d_j|, \, i, j = 1 \ldots n. \quad (2)$$

This is equivalent to the absolute maximum off-diagonal element of the Gram matrix, G=D*D.

The relationship between mutual coherence and successful data reconstruction is appealing for analysis. Typically, for seismic applications, this type of analysis would be prohibitively expensive to compute. However, if S is allowed to be a Fourier transform, then the definition of mutual coherence in equation 2 can be simplified to $$\mu(R) = \max_{l \neq 0} |\hat{r}_l| \quad (3)$$

where $\hat{r}_l$ are Fourier coefficients of diag(R*R). This can be interpreted as finding the largest non-DC Fourier component of a given sampling grid, which can be carried out efficiently using the fast transform. Equation 3 can serve as a proxy for mutual coherence when S is some over-complete dictionary, such as curvelet and generalized windowed Fourier transform (GWT).

Given the estimate for mutual coherence in equation 3, the non-uniform optimal sampling design seeks a sampling grid which minimizes the mutual coherence as follows, $$\min_R \mu(R) = \min_R \max_{l \neq 0} |\hat{r}_l| \quad (4)$$

The optimization problem in equation 4 can be effectively solved by, for example randomized greedy algorithms such as GRASP (Feo and Resende, 1995). In practice, the non-uniform optimal sampling design can be applied to both source and receiver sides.

Seismic Data Reconstruction

Seismic data acquired from the non-uniform optimal sampling design can be reconstructed to a finer grid by solving an analysis-based basis pursuit denoising problem:

$$\min_u \|Su\|_1 \text{ s.t. } \|Ru - b\|_2 \leq \sigma. \quad (5)$$

Here σ is some approximation of noise level in the acquired data b. While conventional interpolation techniques focus on filling in acquisition holes or increasing fold, CS-based data reconstruction improves sampling and extends unaliased bandwidth. Seismic data must be acquired in an irregular fashion in order to employ CS-based data reconstruction. Ideally with a proper non-uniform optimal sampling design, we can increase the unaliased bandwidth by a factor of 2-4 in a certain direction.

EXAMPLE 1

A production streamer survey is described in this example to illustrate design and reconstruction of marine seismic data in accordance with the present invention. A vessel equipped with a flip-flop source shooting every 18.75 m (on average) was used to acquire 3D streamer survey. Total of 12 streamers were towed behind the vessel. Each streamer was 5 km in length and 600 m in spread width.

Figure 1B:
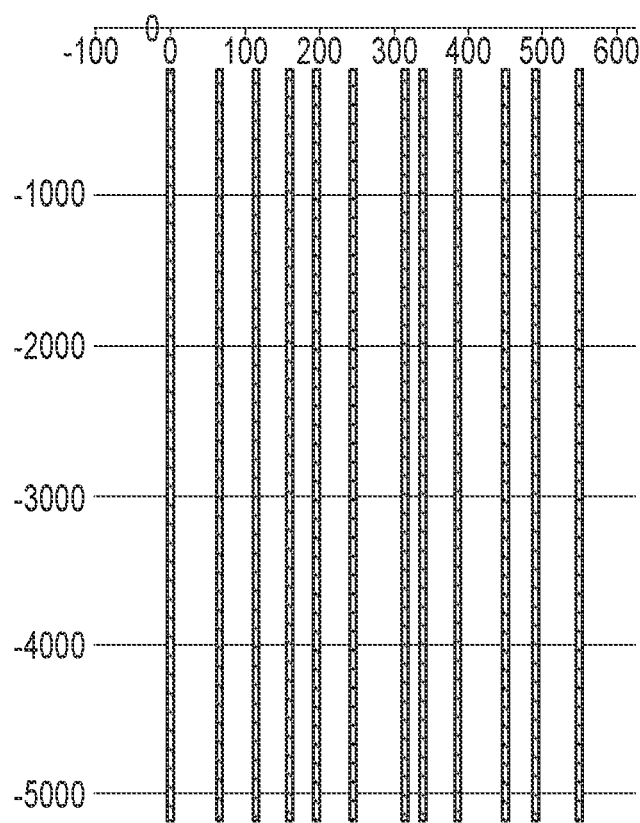
Figure 2A:
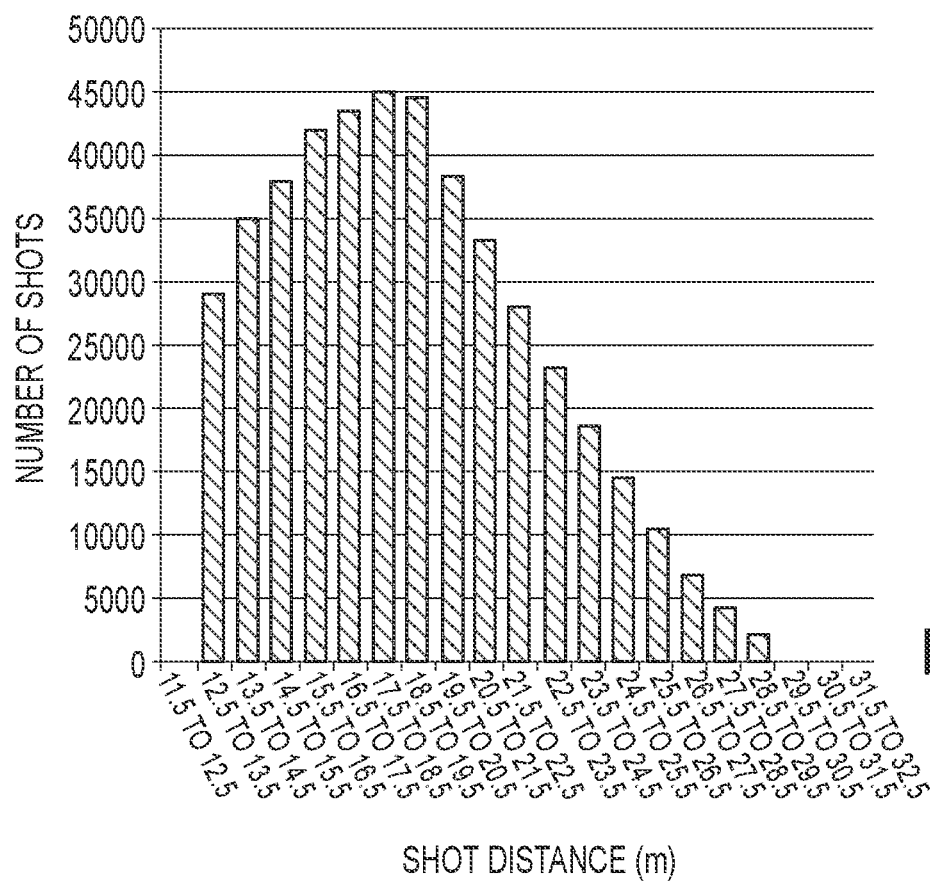
FIGS. 2A-2B illustrate an embodiment of non-uniform optimal sampling design utilizing 16 streamers.
Figure 2B:
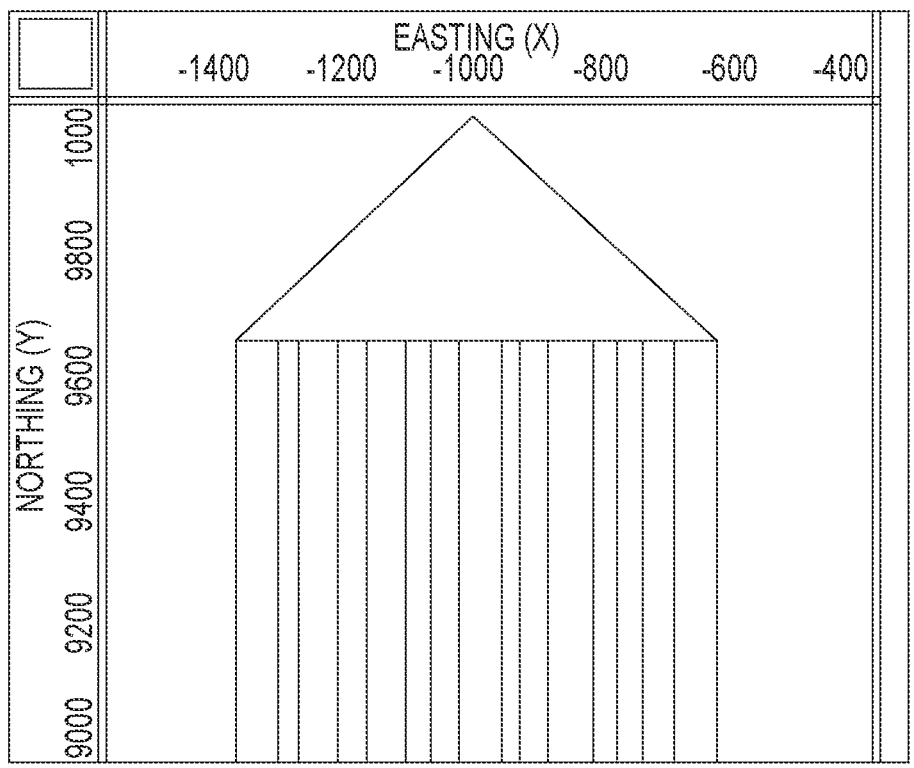

Non-uniform optimal sampling source design was utilized to improve in-line sampling. Non-uniform optimal sampling cable design was utilized to improve cross-line sampling. Design considerations include, but are not limited to, minimum airgun cycle time, minimum cable separation, spread balancing, and the like. FIGS. 1A-1B illustrates non-uniform optimal sampling design principles as applied to a 12 cable configuration. Referring to FIG. 1A, a shot interval distribution from a single gun according to an embodiment is plotted. While FIG. 1A shows shot interval ranging from about 25 m to 50 m, other distance ranges may be consistent with NUOS design depending on a number of factors such as the cable configuration. FIG. 1B shows a cable configuration according to an embodiment. As shown, the cable interval may have non-uniform spacing (ranging from about 25 m to about 200 m). FIGS. 2A-2B illustrate non-uniform optimal sampling design principles as applied to a 16 cable configuration. As shown in FIG. 2A, the shot interval may range from about 10 m to about 31 m. In some embodiments, the shot interval may range from about 5 m to about 100 m. FIG. 2B shows non-uniform spacing of a 16 cable configuration in accordance with an embodiment.

Blended Source Acquisition

In conventional seismic data acquisition, sources are activated with adequate time intervals to ensure no interference between adjacent sources. The acquisition efficiency is limited by equipment and operational constraints. In particular, the source side sampling is often coarse and aliased if long record lengths are needed to obtain energy from far offsets.

In blended source acquisition, multiple sources may be activated within a single conventional shotpoint time window. Overlapping sources in time allows dramatic reduction in time associated with acquisition. It can also improve spatial sampling by increasing shot density. The tradeoff is that sources are blended together and generate so-called "blending noise". The process of separating sources and forming interference-free records is commonly referred to as "deblending."

For marine towed streamer and ocean bottom seismic (OBS), blended source acquisition can be carried out using multiple source vessels shooting simultaneously, or a single source vessel firing at a short time interval. Early marine simultaneous source experiment used an extra source vessel sailing behind the streamer vessel. Two sources were distance-separated and F-K filter was applied to separate shots. Later on, the concept of introducing small random time delays between each pair of sources was developed. Under this time-dithering scheme, interference between two sources became asynchronous incoherent noise and could be suppressed during conventional pre-stack time migration. Recent developments proposed the time-scheduling method for OBS which required little coordination between sources.

Each source was assigned a set of random source initiation times and shots were taken following these times.

Both time-dithering and time-scheduling methods required extra manipulation of shot time and sometimes even vessel speed, which further complicates field operation and lead to potential human errors. Blended source acquisition can also be applied to NUOS. The NUOS scheme puts no constraints on shot time and makes minimal operational changes compared to conventional seismic acquisition. Both sampling density and deblending quality can benefit from a joint inversion of data acquired using a NUOS design.

For blended source acquisition, the recording system should be capable of recording continuously. Data should be delivered in a format of continuous records instead of conventional shot gathers. Each continuous record or time segment is expected to contain receiver information and record start and end time stamps within at least microsecond precision. The source positioning data together with shot times can be stored in navigation files modified from one of the standard formats (e.g., SPS, P1/90, P1/11, etc). To better assist inversion-based deblending, time stamps from all shots should be recorded including production, non-production and infill shots, also within at least microsecond precision.

Figure 3:
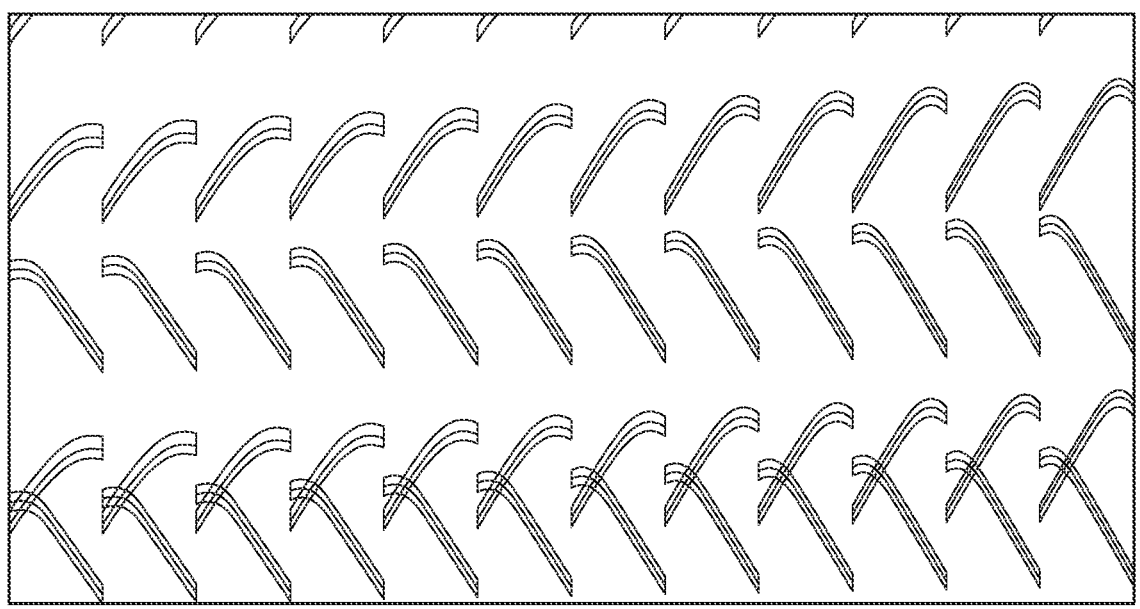
FIG. 3 illustrates an onboard quality control (QC) for continuous records.

Routine onboard QC procedures can still be employed. Continuous records can be examined onboard by displaying the "time-segment gather" (i.e., data within a certain time window sorted by receivers). In this domain, blended shots are observed as coherent energy, regardless of uniform or non-uniform shooting patterns. FIG. 3 illustrates a snapshot of onboard QC, showing a time-segment gather over the entire receiver patch. The opposite-trending moveouts indicate shots that were activated from two distanced sources. This survey employed dual-vessel simultaneous shooting with NUOS design and led to a reduction in overall survey time, including time for receiver deployment, mobilization and demobilization. Onboard processing was kept to a minimum to avoid damaging the integrity of the continuous records.

CS-Based Survey Design Principle

Separating blended sources can be better solved under a CS framework. Forward solutions have been proposed by exploiting the sparsity of seismic data, such as the generalized windowed Fourier. The non-uniform sampling scheme favors the inversion-based deblending by promoting the incoherence of blending noise. For seismic acquisition, a measure of incoherence ("mutual coherence") is used to guide the non-uniform survey design. Referring back to equations 2-4, a proxy of mutual coherence can be effectively computed using the Fourier transform. Non-uniform optimal sampling minimizes mutual coherence to obtain an optimal survey design.

EXAMPLE 2

Figure 4:
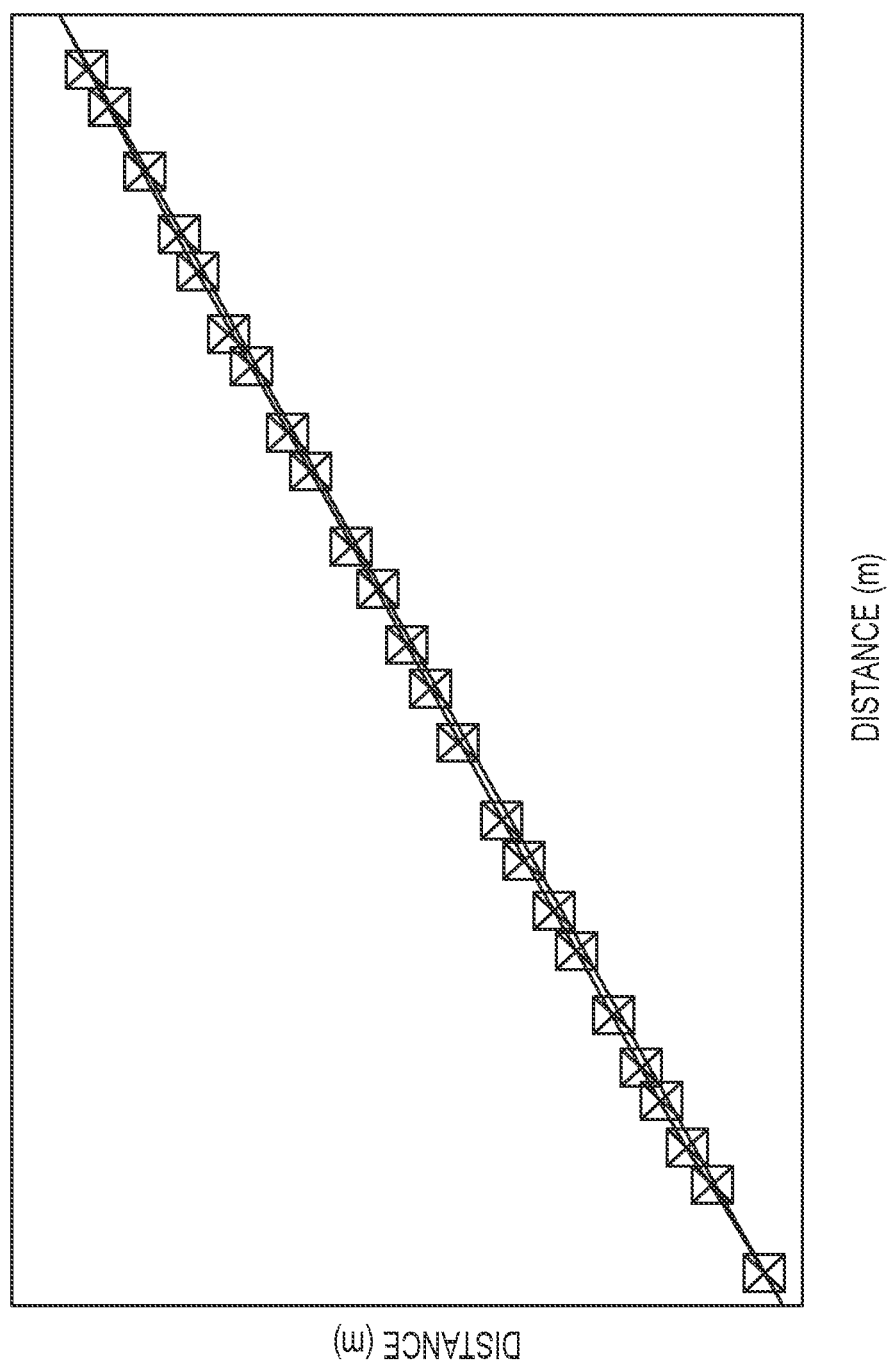
FIG. 4 illustrates implementation of non-uniform optimal sampling shot spacing in the field.

A field trial was conducted in the early stage of development. FIG. 4 illustrates an aspect of the field trial. Each red dot represents a pre-plot shot location derived from the optimization process, and each red box represents a shot point in the field. Through the course of the field trial, 0.5 m inline accuracy was achieved for 99:6% shots. The field trial removed barriers to implementing NUOS design on shots in production surveys.

Figure 5A:
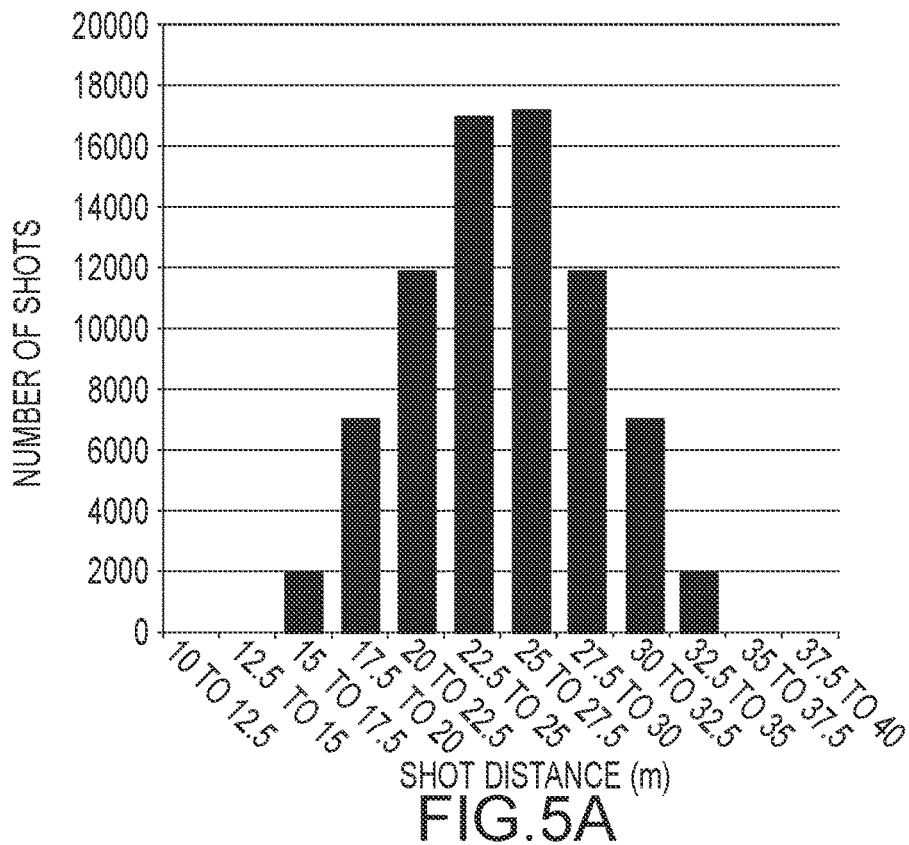
FIGS. 5A-5B illustrate non-uniform optimal sampling shot design statistics from a production survey.
Figure 5B:
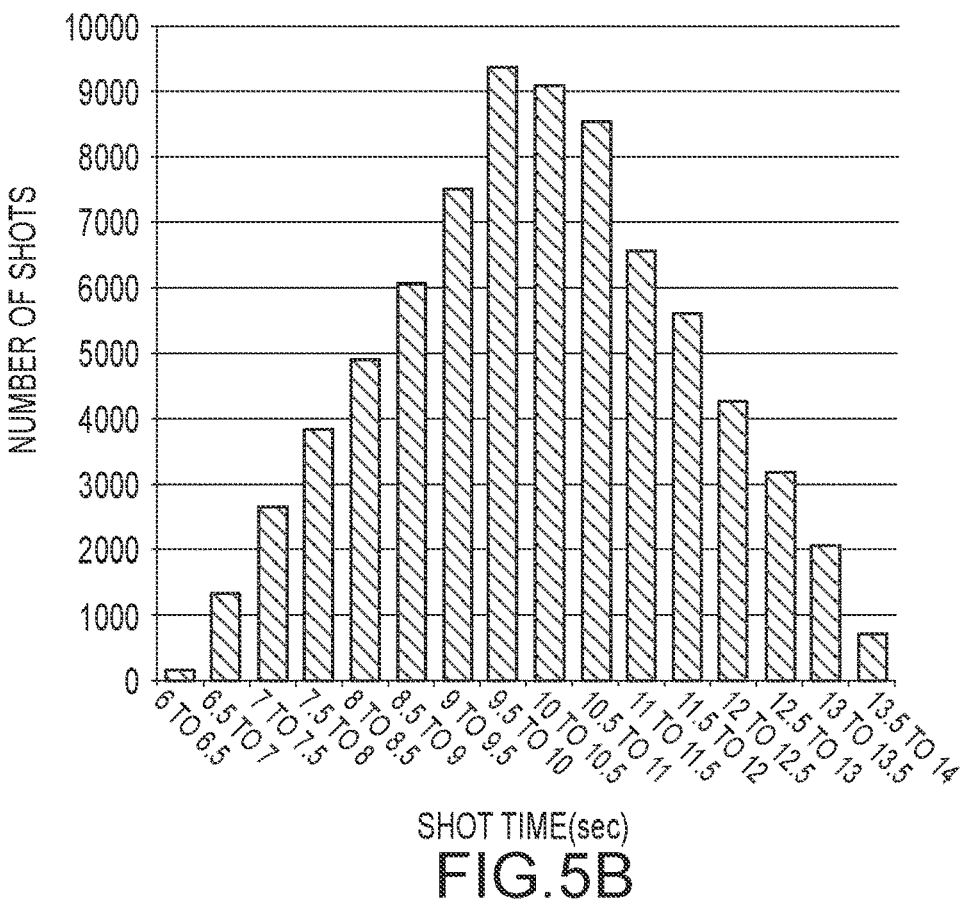

For blended source acquisition, we rely on the non-uniform design in space, which by nature gives rise to irregularity in time, to generate the incoherent blending pattern needed for source separation. FIGS. 5A-5B show statistics from a production survey designed with non-uniform optimal sampling shot spacing. FIG. 5A plots a distribution of shot intervals that ranged from 15 m to 35 m. FIG. 5B plots a distribution of rendered shot time intervals that ranged from 6 s to 14 s.

Figure 6A:
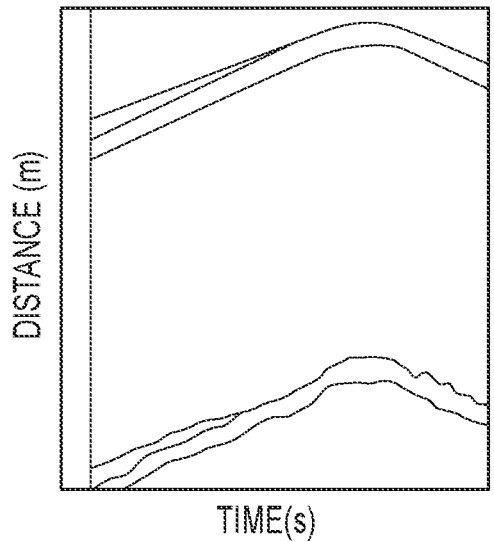
FIGS. 6A-6D illustrate a comparison of a non-uniform optimal sampling shot design to a conventional regular design on deblending quality.
Figure 6B:
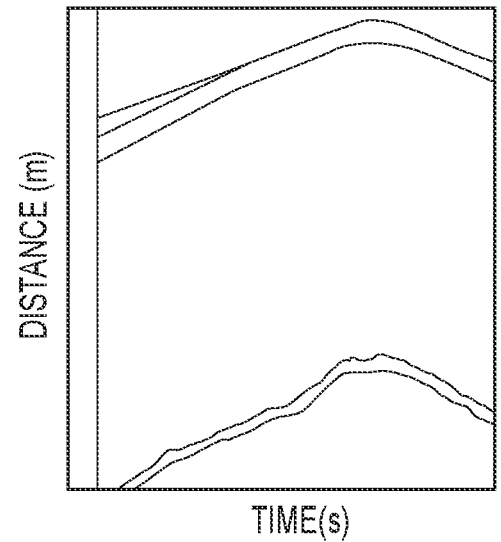
Figure 6C:
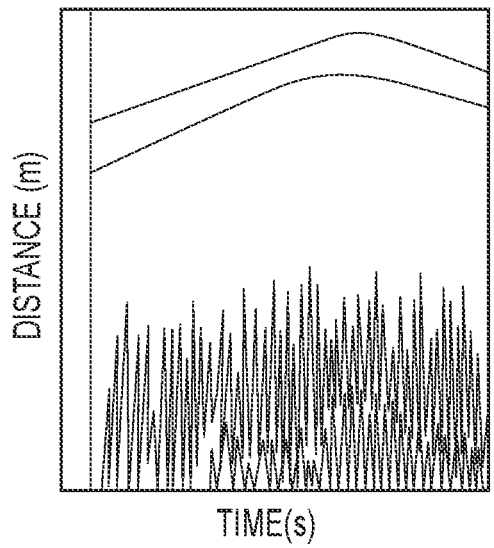

FIGS. 6A-6D compare data acquired with a NUOS design and a conventional regular design, both from the same survey. Fifteen seconds record length was kept to preserve far offsets and converted waves. FIG. 6A shows a receiver gather, as part of a velocity line, with shots spaced at regular 25 m intervals. As shown, self-blending occurred after 10 s. The interference pattern was somewhat incoherent even with a regular shot spacing, thanks to natural variations in vessel speed. FIG. 6C shows the same receiver with production shots optimally spaced at nominal 25 m intervals. The interference from self-blending came in as early as 7.5 s and spread over a longer time interval. The incoherence of blending noise was significantly enhanced by the NUOS design.

Figure 6D:
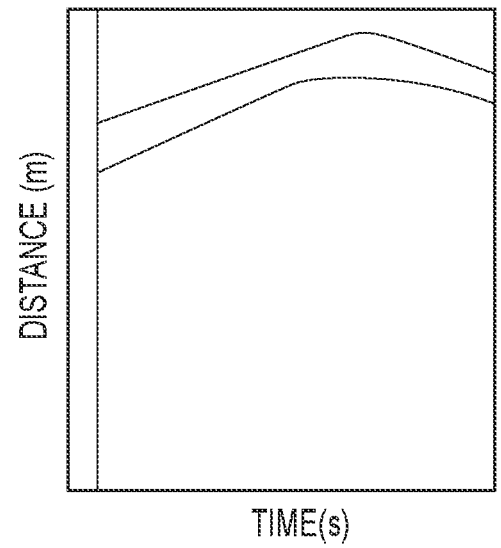

The same inversion-based deblending method was applied on both datasets for a fair comparison. The method solves an analysis-based $l_1$ minimization using the non-monotone ADM (Li et al., 2013b). FIGS. 6B and 6D show the corresponding deblending results. For data with a regular design, we see a fair amount of blending noise leaked through deblending, due to insufficient incoherence to separate signal from noise. On the other hand, a much improved deblending result was achieved from data with a NUOS design. The blending noise was reduced to a minimum while primaries were intact. This result indicates that the NUOS design was preferable for the inversion-based deblending method. A similar conclusion has been observed from dual-vessel simultaneous shooting.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method of acquiring seismic data, the method comprising:
   determining a non-uniform optimal sampling design by calculating a compressive sensing sampling grid that minimizes mutual coherence;
   determining a placement of a plurality of receiver lines at a non-uniform optimal line interval according to the non-uniform optimal sampling design;
   determining a placement of a plurality of receivers at a non-uniform optimal receiver interval according to the non-uniform optimal sampling design; and
   obtaining seismic data according to the non-uniform optimal sampling design, the seismic data captured via the plurality of receivers in response to at least one of a plurality of shots fired from one or more seismic sources at non-uniform optimal shot intervals, wherein the plurality of receivers are operably placed at a non-uniform optimal receiver interval.

2. The method of claim 1, wherein the mutual coherence is determined by:

$$\mu(R, S) = \max_{i \neq j} |d_i^* d_j|, \ i, j = 1 \ldots n,$$

and the mutual coherence is minimized by:

$$\min_R \mu(R) = \min_R \max_{l \neq 0} |\hat{r}_l|,$$

where S is sparsity basis, R is a sampling operator, µ is the mutual coherence, $\hat{r}_l$ are Fourier coefficients of diag(R*R), and $d_i$ are columns in D which is defined as D=RS*.

3. The method of claim 1, wherein the seismic data is obtained via land, ocean-bottom seismic, or marine survey.

4. The method of claim 1, wherein the plurality of receiver lines are a plurality of streamers operable to be attached to a vessel, wherein the plurality of streamers are spaced apart at the non-uniform optimal line interval, wherein the plurality of receivers are coupled with the plurality of streamers.

5. The method of claim 4, wherein the plurality of streamers range from 6 to 50 streamers.

6. The method of claim 4, wherein the plurality of streamers includes at least a first interval between any two adjacent streamers of the plurality of streamers, and a second interval between any two other adjacent streamers of the plurality of streamers, wherein the first interval and the second interval are different.

7. The method of claim 6, wherein the first interval and/or the second interval ranges from 25 m to 500 m.

8. The method of claim 1, wherein the plurality of receivers includes at least a first interval between any two adjacent receivers of the plurality of receivers, and a second interval between any two other adjacent receivers of the plurality of receivers, wherein the first interval and the second interval are different, and wherein the first interval and/or the second interval ranges from 5 m to 100 m.

9. The method of claim 1, wherein the plurality of receivers are coupled with the plurality of receiver lines.

10. The method of claim 9, the plurality of receiver lines includes at least a first interval between any two adjacent receiver lines of the plurality of receiver lines, and a second interval between any two other adjacent receiver lines of the plurality of receiver lines, wherein the first interval and the second interval are different, and wherein the first interval and/or the second interval ranges from 25 m to 500 m.

11. The method of claim 1, wherein the plurality of shots at the non-uniform optimal shot intervals are from more than one of the one or more seismic sources shooting simultaneously.

12. The method of claim 11, wherein the non-uniform optimal sampling design corresponds to a land, ocean-bottom seismic, or marine survey.

13. The method of claim 11, wherein the plurality of receiver lines are a plurality of streamers operable to be attached to a vessel, wherein the plurality of streamers are operable to be spaced apart at a non-uniform optimal streamer interval, wherein the plurality of receivers are coupled with the plurality of streamers.

14. The method of claim 13, wherein the plurality of streamers includes at least a first interval between any two adjacent streamers of the plurality of streamers, and a second interval between any two other adjacent streamers of the plurality of streamers, wherein the first interval and the second interval are different, and wherein the first interval and/or the second interval ranges from 25 m to 500 m.

15. A method of acquiring seismic data, the method comprising:
determining a non-uniform optimal sampling design by calculating a compressive sensing sampling grid that minimizes mutual coherence;
determining a positioning of a plurality of receiver lines at a non-uniform optimal line interval
determining a positioning of a plurality of receivers at a non-uniform optimal receiver interval;
determining a positioning of a plurality of shots from one or more seismic sources at non-uniform optimal shot intervals; and
obtaining seismic data according to the non-uniform optimal sampling design, the seismic data captured via the plurality of receivers in response to at least one of the plurality of shots fired from the one or more seismic sources at the non-uniform optimal shot intervals.

16. The method of claim 15, wherein the mutual coherence is determined by:

$$\mu(R, S) = \max_{i \neq j} |d_i^* d_j|, \ i, j = 1 \ldots n,$$

and the mutual coherence is minimized by:

$$\min_R \mu(R) = \min_\beta \max_{i \neq 0} |\hat{r}_i|,$$

where S is sparsity basis, R is a sampling operator, p is the mutual coherence, and $\hat{r}_l$ are Fourier coefficients of diag (R*R), and $d_i$ are columns in D which is defined as D=RS*.

17. The method of claim 15, wherein the plurality of receivers includes at least a first interval between any two adjacent receivers of the plurality of receivers, and a second interval between any two other adjacent receivers of the plurality of receivers, wherein the first interval and the second interval are different, and wherein the first interval and/or the second interval ranges from 5 m to 100 m.

18. The method of claim 15, wherein the plurality of receivers are coupled with the plurality of receiver lines.

19. The method of claim 15, the plurality of receiver lines includes at least a first interval between any two adjacent receiver lines of the plurality of receiver lines, and a second interval between any two other adjacent receiver lines of the plurality of receiver lines, wherein the first interval and the second interval are different, and wherein the first interval and/or the second interval ranges from 25 m to 500 m.

20. The method of claim 15, wherein the plurality of shots at the non-uniform optimal shot intervals are fired from more than one source shooting simultaneously.

* * * * *